US012615605B2

(12) United States Patent
Ye et al.

(10) Patent No.: US 12,615,605 B2
(45) Date of Patent: Apr. 28, 2026

(54) SYSTEMS AND PROCEDURES OF NON-TERRESTRIAL NETWORK TIMING RELATIONSHIP

(71) Applicant: Apple Inc., Cupertino, CA (US)

(72) Inventors: Chunxuan Ye, San Diego, CA (US);
Dawei Zhang, Saratoga, CA (US);
Haitong Sun, Cupertino, CA (US);
Hong He, San Jose, CA (US); Jie Cui,
San Jose, CA (US); **Oghenekome
Oteri, San Diego, CA (US); Pavan
Nuggehalli**, San Carlos, CA (US);
Sarma V. Vangala, Campbell, CA
(US); Wei Zeng, Saratoga, CA (US);
Yushu Zhang, Beijing (CN)

(73) Assignee: Apple Inc., Cupertino, CA (US)

( * ) Notice: Subject to any disclaimer, the term of this
patent is extended or adjusted under 35
U.S.C. 154(b) by 625 days.

(21) Appl. No.: 17/774,798

(22) PCT Filed: Sep. 24, 2021

(86) PCT No.: PCT/CN2021/120114
§ 371 (c)(1),
(2) Date: May 5, 2022

(87) PCT Pub. No.: WO2023/044703
PCT Pub. Date: Mar. 30, 2023

(65) Prior Publication Data
US 2023/0284165 A1     Sep. 7, 2023

(51) Int. Cl.
*H04W 56/00*          (2009.01)
*H04B 7/185*          (2006.01)
(Continued)

(52) U.S. Cl.
CPC ...... *H04W 56/0045* (2013.01); *H04B 7/1851*
(2013.01); *H04L 1/0038* (2013.01); *H04W
56/009* (2013.01); *H04W 84/06* (2013.01)

(58) Field of Classification Search
CPC ........... H04W 56/0045; H04W 56/009; H04W
84/06; H04B 7/1851; H04L 1/0038
See application file for complete search history.

(56) References Cited

U.S. PATENT DOCUMENTS

2019/0394770 A1 * 12/2019 Wang ................... H04W 76/28
2020/0252979 A1     8/2020 Kawasaki
(Continued)

FOREIGN PATENT DOCUMENTS

CN        110536466        12/2019
CN        110740517        1/2020
(Continued)

OTHER PUBLICATIONS

Extended European Search Report for EP Patent Application No.
21899289.9; 15 pages; Dec. 13, 2022.
(Continued)

*Primary Examiner* — Redentor Pasia
(74) *Attorney, Agent, or Firm* — Kowert, Hood, Munyon,
Rankin & Goetzel, P.C.

(57) ABSTRACT

Methods, apparatuses, and systems are disclosed for enhancing timing relationships in non-terrestrial networks (NTNs), e.g., by managing timing offset values and intelligently handling reporting failure relating to timing information reporting. To accommodate increased propagation delay in NTNs, a user equipment (UE) may supplement its timing advance (TA) value with component values representing roundtrip times to the satellite. The UE may maintain both open-loop and closed-loop portions of the TA value, and may report the TA value, or components thereof, to the
(Continued)

Determine the satellite scenario
*502*

Determine the reference SCS
*504*

Receive cell-specific Koffset/Kmac in units of
slots, in terms of reference SCS
*506*

Calculate the actual Koffset/Kmac in terms of
the UE's SCS
*508* network for timing synchronization. Methods and systems are also disclosed for failure handling in this reporting process.

20 Claims, 6 Drawing Sheets

(51) Int. Cl.
  H04L 1/00        (2006.01)
  H04W 84/06       (2009.01)

(56) References Cited

U.S. PATENT DOCUMENTS

| | | | | |
|---|---|---|---|---|
| 2021/0105731 A1* | 4/2021 | Lin | | H04W 56/0045 |
| 2021/0105761 A1* | 4/2021 | Cheng | | H04L 5/0053 |
| 2021/0289460 A1 | 9/2021 | Medles et al. | | |
| 2021/0344413 A1* | 11/2021 | Gao | | H04W 24/02 |
| 2021/0345280 A1* | 11/2021 | Zhang | | H04W 56/0005 |
| 2022/0369264 A1* | 11/2022 | Cheng | | H04W 56/0055 |
| 2022/0394650 A1* | 12/2022 | Wu | | H04W 56/0045 |
| 2023/0039872 A1* | 2/2023 | Khoshkholgh Dashtaki | | |
| | | | | H04W 72/1268 |
| 2023/0068762 A1* | 3/2023 | Lin | | H04W 56/0045 |
| 2024/0089964 A1* | 3/2024 | Yeo | | H04L 27/26025 |
| 2024/0121737 A1* | 4/2024 | Shin | | H04B 7/1851 |

FOREIGN PATENT DOCUMENTS

| | | |
|---|---|---|
| CN | 111448833 | 7/2020 |
| CN | 112601277 | 4/2021 |
| CN | 113347697 | 9/2021 |
| CN | 113382440 A | 9/2021 |
| WO | 20200131120 | 2/2020 |
| WO | 2021022442 A1 | 2/2021 |
| WO | 2021139665 A1 | 7/2021 |
| WO | 2021164579 A1 | 8/2021 |

OTHER PUBLICATIONS

Ericsson "Random access capacity for NTN": 3GPP TSG RAN WG2 #106 R2-1907302; Reno, US; 5 pages; May 13, 2019.

Ericsson "On random access procedures for NTN"; 3GPP TSG RAN WG2 #106 R2-1907296; Reno, US; 5 pages; May 13, 2019.

Cewit et al. "UL time synchronization methods for NTN systems"; 3GPP TSG RAN WG1 #104-e R1-2101717; 7 pages; Jan. 25, 2020.

Ericsson (Moderator) "Feature lead summary on timing relationship enhancements"; 3GPP TSG RAN WG1 Meeting #102-e R1-200xxxx; 64 pages; Aug. 17, 2020.

International Search Report and Written Opinion for PCT/CN2021/120114; 10 pages; Jun. 1, 2022.

Sony "FL Summary 2 of AI 8.15.2: Timing relationships for IoT-NTN"; 3GPP TSG RAN WG1 #106-e R1-2108350; 49 pages; Aug. 19, 2021.

Examination Report for 202217053487; Mar. 29, 2026.

Office Action for CN 202180007220.5; Jun. 23, 2025.

"Timing relationship enhancements in NTN" 3GPP TSG RAN WG1#104bis-e R1-2102732; Apr. 12, 2021.

"Correction to transmission timing adjustments in TS 38.213" 3GPP TSG-RAN1 Meeting #96 R1-1903538; Feb. 25, 2019.

* cited by examiner

SYSTEMS AND PROCEDURES OF NON-TERRESTRIAL NETWORK TIMING RELATIONSHIP

PRIORITY CLAIM

This application is a national phase entry of PCT application number PCT/CN2021/120114, entitled "Systems and Procedures of Non-Terrestrial Network Timing Relationship," filed Sep. 24, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for enhancing timing relationships in non-terrestrial networks.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, as diverse network technologies are integrated with more traditional cellular network technologies, new network characteristics may arise. As one example, introducing new classes of cellular base stations or repeater stations, such as non-terrestrial networks, may introduce propagation delays that are noticeably greater, and noticeably more variable, than those associated with more traditional base stations. These characteristics may lead to a degraded user experience in such networks. Accordingly, improvements in the field are desired.

SUMMARY

Embodiments are presented herein of apparatuses, systems, and methods for enhancing timing relationships in non-terrestrial networks (NTNs).

For example, a method is described for handling reporting failure relating to timing information reporting in a cellular communication non-terrestrial network, the method may be performed by a user equipment (UE) device. The UE device may detect a trigger event indicating that a scheduling offset value stored by the UE device should be updated. In response to the detecting the trigger event, the UE device may transmit to the non-terrestrial network information regarding a current timing advance value calculated by the UE device. The UE device may determine whether an updated scheduling offset value has been received, responsive to the current timing advance value, within a predetermined duration following the transmitting the information regarding the current timing advance value. In response to determining that the updated scheduling offset value has not been received within the predetermined duration, UE device may again transmit information regarding a current timing advance value calculated by the UE device.

In some scenarios, detecting the trigger event indicating that the scheduling offset value should be updated may include calculating the current timing advance value. Detecting the trigger event may further include determining that the current timing advance value differs from a previously calculated and successfully reported timing advance value by at least a predetermined threshold, wherein the current timing advance value differing from the previously calculated and successfully reported timing advance value by at least the predetermined threshold constitutes an indication that the scheduling offset value should be updated.

In some scenarios, the again transmitting information regarding the current timing advance value calculated by the UE device may include calculating a new current timing advance value in response to the determining that the updated scheduling offset value has not been received within the predetermined duration; and transmitting information regarding the new current timing advance value.

In some scenarios, a length of the predetermined duration may be based at least in part on a satellite altitude scenario of the non-terrestrial network.

In some scenarios, a length of the predetermined duration may be determined by the UE device, based at least in part on a roundtrip propagation delay between the UE device and a base station of the non-terrestrial network.

In some scenarios, the UE device may receive from the non-terrestrial network an indication of a length of the predetermined duration. In some such scenarios, the indication of the length of the predetermined duration may include an indication of a number of slots in terms of a reference sub-carrier spacing, wherein the reference sub-carrier spacing depends on a satellite altitude scenario of the non-terrestrial network.

In some scenarios, the current timing advance value may be calculated by the UE device based at least partly on a determination of a distance between the UE device and a satellite of the non-terrestrial network.

A method is described for handling reporting failure relating to timing information reporting in a cellular communication non-terrestrial network. The method may be performed by a user equipment (UE) device. The UE device may detect a trigger event indicating that a scheduling offset value stored by the UE device should be updated. In response to the detecting the trigger event, the UE device may determine a number of blind transmissions on which to transmit to the non-terrestrial network information regarding a current timing advance value calculated by the UE device. The UE device may transmit the determined number of blind transmissions, wherein each of the blind transmissions includes the information regarding the current timing advance value calculated by the UE device.

In some scenarios, the detecting the trigger event indicating that the scheduling offset value should be updated may include calculating the current timing advance value; and determining that the current timing advance value differs from a previously calculated and successfully reported timing advance value by at least a predetermined threshold, wherein the current timing advance value differing from the previously calculated and successfully reported timing advance value by at least the predetermined threshold constitutes an indication that the scheduling offset value should be updated. In some such scenarios, the number of blind transmissions on which to transmit the information regarding the current timing advance value may depend on a difference between the current timing advance value and the previously calculated and successfully reported timing advance value.

In some scenarios, the number of blind transmissions on which to transmit the information regarding the current timing advance value may depend on a difference between the scheduling offset value stored by the UE device and the current timing advance value.

In some scenarios, the number of blind transmissions on which to transmit the information regarding the current timing advance value may depend on a number of previous instances in which the UE device did not receive an updated scheduling offset value in response to transmitting one or more blind transmissions including information regarding a timing advance value calculated by the UE device.

In some scenarios, the information regarding the current timing advance value may include an indication of a number of slots in terms of a reference sub-carrier spacing, and the reference sub-carrier spacing may depend on a satellite altitude scenario of the non-terrestrial network.

In some scenarios, the current timing advance value may be calculated by the UE device based at least partly on a determination of a distance between the UE device and a satellite of the non-terrestrial network.

A method is disclosed for updating a timing advance value for timing synchronization in a cellular communication non-terrestrial network, wherein the timing advance value represents a dynamic sum of a plurality of timing offset values. The method may be performed by a user equipment (UE) device. The UE device may dynamically update a closed-loop timing offset value of the plurality of timing offset values upon receiving, from the non-terrestrial network, adjustment values representing timing offsets based on reception times of respective communications received by the non-terrestrial network from the UE device, wherein dynamically updating the closed-loop timing offset value includes adding the received adjustment values to the present closed-loop timing offset value. The UE device may update, at a first time, a UE-specific timing offset value of the plurality of timing offset values to reflect a first roundtrip propagation time between the UE device and a satellite of the non-terrestrial network, wherein the first roundtrip propagation time is calculated by the UE based on first location information regarding at least one of the UE device or the satellite, wherein the updating is performed in response to the UE device receiving the first location information. The UE device may update, at a second time, subsequent to the first time, the UE-specific timing offset value to reflect a second roundtrip propagation time between the UE device and the satellite, wherein the second roundtrip propagation time is calculated by the UE based on second location information regarding at least one of the UE device or the satellite, wherein the updating is performed in response to the UE device receiving the second location information. Upon updating the UE-specific timing offset to reflect the second roundtrip propagation time, the UE device may reduce the closed-loop timing offset value by an amount equal to the adjustment values received between the first time and the second time, wherein reducing the closed-loop portion is in response to determining at least one of three different criteria: a difference ($\Delta$NTA,UE-specific) between the UE-specific timing offset value at the first time and the UE-specific timing offset value at the second time meets a first predefined threshold; a difference ($\Delta$NTA) between the closed-loop timing offset value at the first time and the closed-loop timing offset value at the second time meets a second predefined threshold; or a difference between $\Delta$NTA and $\Delta$NTA,UE-specific is below a third predefined threshold.

In some scenarios, the values of at least one of the first predefined threshold, the second predefined threshold, or the third predefined threshold may depend on a satellite altitude scenario of the non-terrestrial network.

Apparatuses and non-transitory computer-readable memory media are disclosed for implementing any of the disclosed methods.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
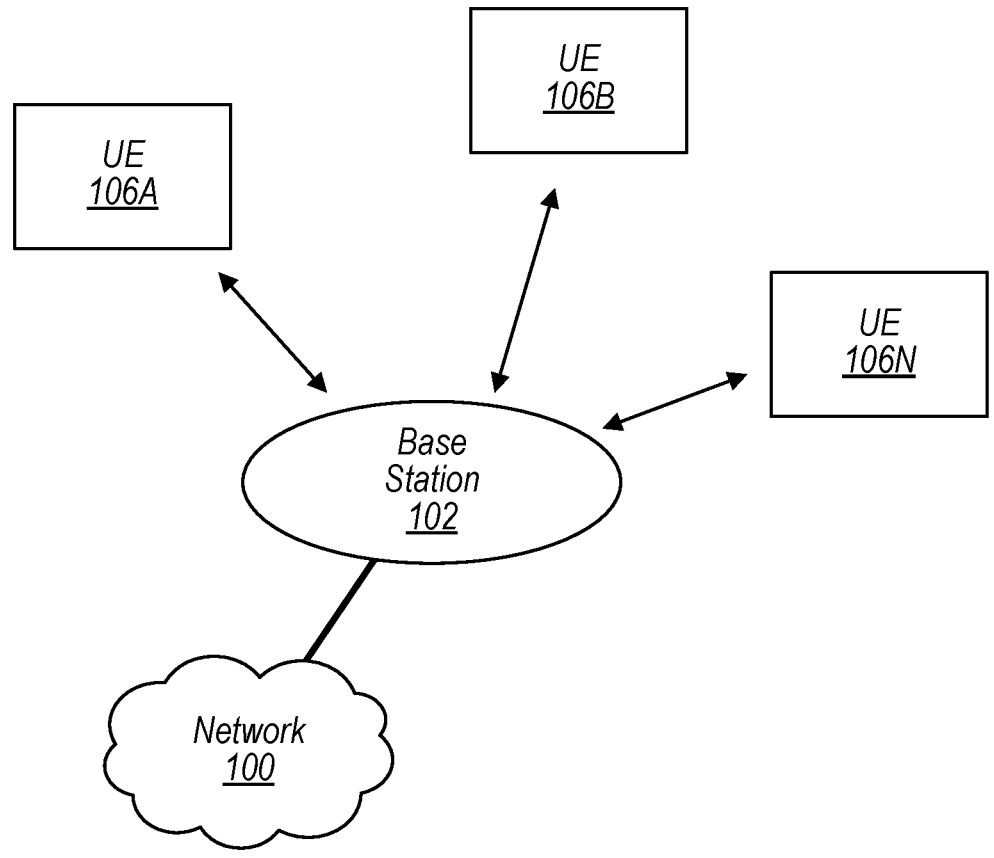
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
GSM: Global System for Mobile Communication
UMTS: Universal Mobile Telecommunication System
EUTRA: Evolved UMTS Terrestrial Radio Access
LTE: Long Term Evolution
NR: New Radio
TX: Transmission/Transmit
RX: Reception/Receive
RAT: Radio Access Technology
MAC: Medium Access Control
CE: Control Element
NTN: Non-Terrestrial Network
TA: Timing Advance
LEO: Low-Earth Altitude
MEO: Medium-Earth Altitude
GEO: Geosynchronous Altitude
HAPS: High Altitude Platform System
UAV: Unmanned Aerial Vehicle
SCS: Sub-Carrier Spacing
RAR: Random Access Response
GNSS: Global Navigation Satellite System

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
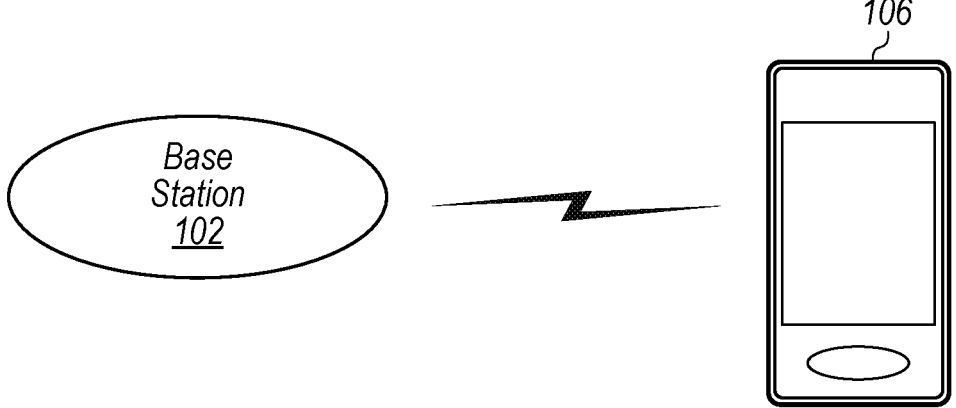
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for enhancing timing relationships in non-terrestrial networks (NTNs), such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments.

The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1xRTT (or LTE or NR, or LTE or GSM), and separate radios for communicating using each of Wi-Fi and BLUETOOTH™. Other configurations are also possible.

Figure 3:
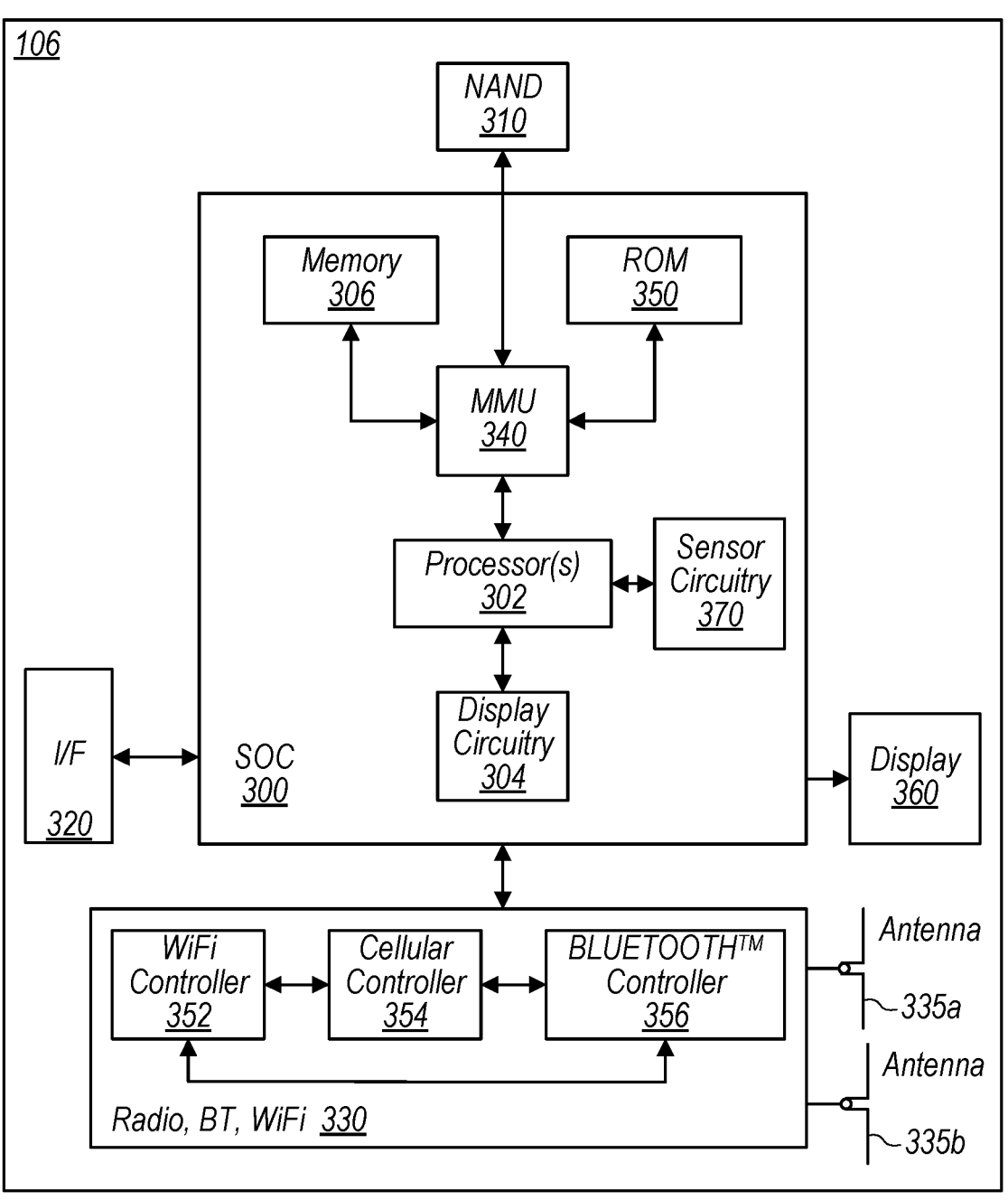
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. In some implementations, the display 360 may include a touchscreen capable of detecting user input, e.g., as touch events. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to enhance timing relationships in NTNs, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to enhance timing relationships in NTNs according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE, LTE-A, and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
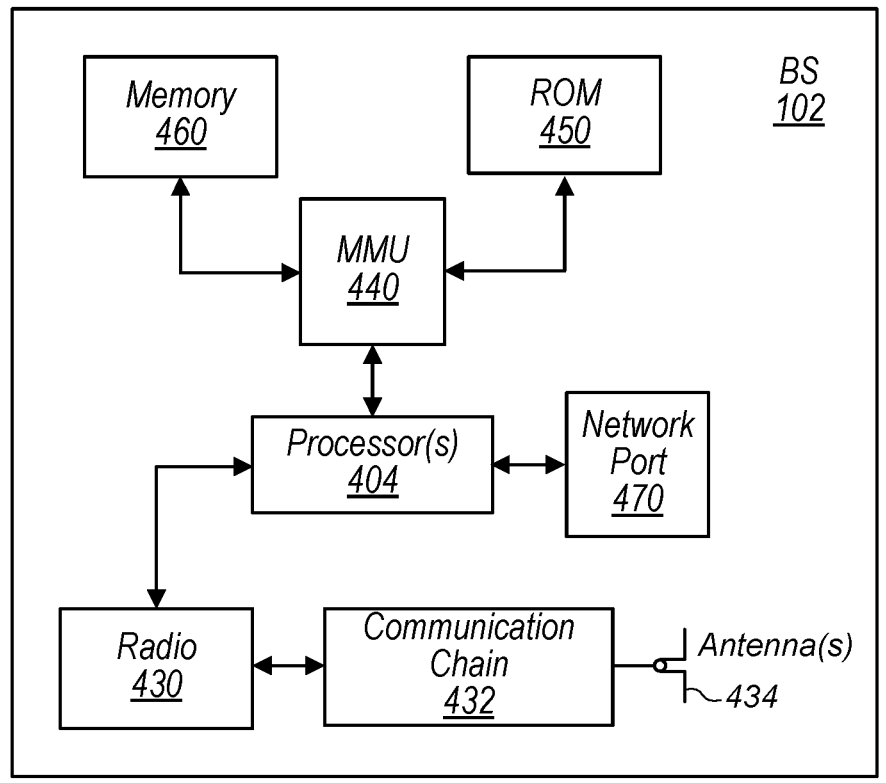
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE device 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

NTN Timing Control

As diverse network technologies are integrated with more traditional cellular network technologies, new network characteristics may arise. As one example, introducing new classes of cellular base stations or repeater stations may introduce propagation delays that are noticeably greater, and noticeably more variable, than those associated with more traditional base stations.

For example, 3GPP has recently expanded to define non-terrestrial networks (NTN) within the 3GPP ecosystem. In such systems, propagation delays between a UE, such as the UE 106, and a non-terrestrial network may be far greater than propagation delays between the UE and a traditional terrestrial base station, because a satellite may be far from the terrestrial UE, relative to distances experienced in terrestrial networks. Additionally, such systems may include cells covering larger geographic areas than traditional cells, which may lead to a large differential in propagation delays at two points within a cell. In other words, in such systems, a UE located at a first point in a cell may experience a significantly greater propagation delay than a UE located at a second point in the same cell.

This increased propagation delay in NTNs may result in poor performance if a UE attempts to directly use network scheduling parameters designed for a terrestrial network. In response to this concern, NTNs may utilize additional timing offset values, to compensate for the increased propagation times.

For example, in various networks, a UE may apply a timing advance (TA) value to adjust when the UE transmits within a slot. The TA value may correspond to the propagation time between two points in the network, such as between the UE and the base station. Alternatively, the TA may correspond to the roundtrip propagation time between such points. Specifically, the UE may offset its transmission time by the time represented by the TA value, with the goal of causing the transmission to arrive at the base station at the scheduled time. If the TA value incorrectly represents the propagation time, then the transmission may arrive early or late, which may cause interference with other signals. Thus, as the distance between the UE and the base station (or repeater, etc.) changes, the TA value may be adjusted. The difference between the correct time at which a transmission should be received at the network and the time at which the transmission is actually received (e.g., the error in the current TA value) is referred to as the TA margin.

In a terrestrial network, a UE may maintain a TA time value, $T_{TA}$, which may be defined as follows:

$$T_{TA}=(N_{TA}+N_{TA,offset})^*T_C \qquad \text{Equation 1}$$

Here, $N_{TA}$ may represent a feedback adjustment value provided by the network to the UE. Specifically, $N_{TA}$ may represent a closed-loop feedback value, determined by the network, based on when a transmission from the UE is received by the network. The value of $N_{TA}$ may be adjusted as needed based on the observed TA margin. $N_{TA,offset}$ may represent a predefined adjustment value, e.g., based on various signal parameters (see 3GPP TS 38.533 V16.8.0, incorporated herein by reference; see esp. Table 4.4.1.0.1-1). The value $T_C$ may represent the physical layer time unit, which may also be referred to as sampling time in the time domain. The value of $T_C$ may be fixed, e.g., at 0.509 ns. Using this formula, the network may provide to the UE the value $N_{TA}$, to allow the UE to maintain an accurate closed-loop value of $T_{TA}$.

In an NTN, the increased, and rapidly variable, distances between the satellite and other network elements may lead to the use of additional variables within the formula used to calculate $T_{TA}$. For example, in an NTN, $T_{TA}$ may be defined as follows:

$$T_{TA}=(N_{TA}+N_{TA,UE\text{-}specific}+N_{TA,common}+N_{TA,offset})*T_C \qquad \text{Equation 2}$$

Here, $T_{TA}$ represents the total roundtrip propagation time between the UE and a timing reference point in the network, which may be the terrestrial base station or some other point in the network. $N_{TA,UE\text{-}specific}$ may represent a value corresponding to the roundtrip propagation delay between the UE and the satellite. Similarly, $N_{TA,common}$ may represent the roundtrip propagation delay between the satellite and the timing reference point. These values are open-loop feedback values, in that they do not depend upon observed timing of transmissions received from the UE.

Determining and communicating these additional values, as well as utilizing both closed-loop feedback and dynamic open-loop feedback simultaneously may introduce complications in timing handling in NTNs, as discussed further below.

TA Command Signaling

In an NTN scenario, the network may communicate the value of $N_{TA}$ to a UE, such as the UE 106, via a TA command. Such TA commands may be carried either in a random access response (RAR) message of msg2/msgB, e.g., when the UE is initially connecting to the network via a RACH procedure, or in a medium access control (MAC) control element (CE), to communicate updated $N_{TA}$ values after initial connection.

When the UE receives a TA command within the MAC CE, the UE may update its stored value of $N_{TA}$ as follows:

$$N_{TA} = N_{TA,old} + (T_A - 31)\cdot\frac{16\cdot64}{2^\mu} \qquad \text{Equation 3}$$

Here, $T_A$ is the value carried by the TA command. The value $N_{TA,old}$ represents the previously stored value of $N_{TA}$; e.g., the value stored upon receipt of the previous TA command. The value $\mu$ is an index representing a sub-carrier spacing (SCS), e.g., based on a table of available SCSs. In some implementations, the SCS value indicated by $\mu$ may be equal to a reference SCS, as discussed further below. In some scenarios, the value indicated by $\mu$ may vary based on the satellite altitude scenario. For example, a GEO satellite moves less quickly in azimuth than a LEO satellite, such that a GEO satellite may appear less mobile to a UE. Therefore, if a UE is communicating with the network via a GEO satellite, $\mu$ may have a first value, while, if the UE is communicating with the network via a LEO satellite, $\mu$ may have a second, smaller value, resulting in a larger TA value, in consequence of the greater apparent mobility of the LEO satellite.

When the UE receives a TA command within a RAR, the UE may store a value of $N_{TA}$ as follows:

$$N_{TA} = N_{TA,old} + T_A\cdot\frac{16\cdot64}{2^\mu} \qquad \text{Equation 4}$$

Because the RAR is used to communicate the value of $N_{TA}$ for initial connection, the UE may not have a previously stored value of $N_{TA}$ for use as $N_{TA,old}$. Therefore, in this scenario, a different value may be selected for $N_{TA,old}$. For example, in some scenarios, the UE may delay transmission of a PRACH signal by some value, to avoid overestimating the initial TA. In some scenarios, this delay value may be used as the initial value of $N_{TA,old}$. In some scenarios, this value may be equal to the timing error limit ($T_e$) (see 3GPP TS 38.533 V16.8.0, Table 4.4.1.0.1-1). In some scenarios this value may be equal to the lesser of one half of the cyclic prefix or one half of the guard period of the PRACH format; i.e., min(CP/2, GP/2). In some scenarios this value may be expressly indicated by the network.

Figure 5:
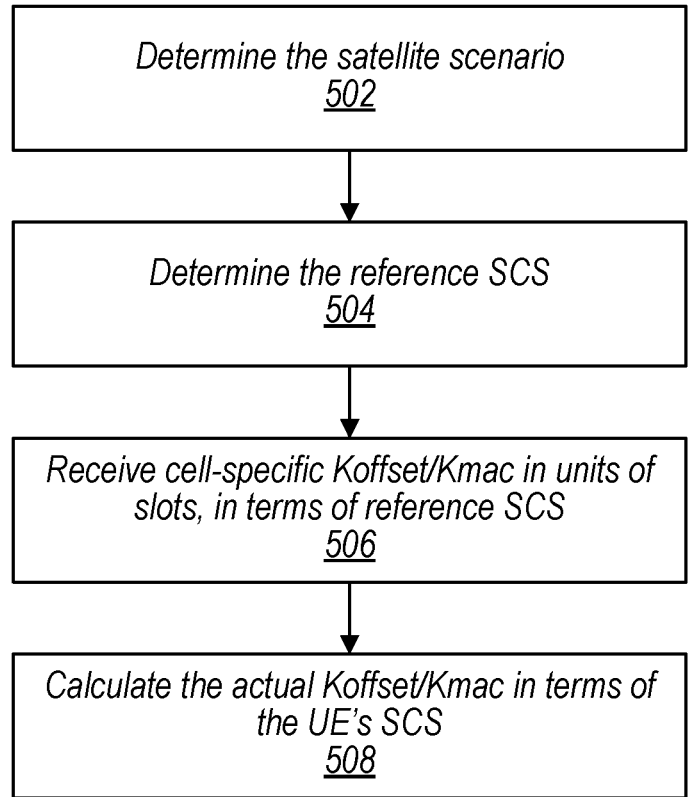
FIG. 5 is a flowchart diagram illustrating a method for receiving cell-specific $K_{offset}$ and $K_{mac}$ values in an NTN network, according to some embodiments.

FIG. 5—Receiving Cell-Specific $K_{offset}$ and $K_{mac}$

When performing UL scheduling in an NTN, the base station may introduce an additional scheduling offset value, $K_{offset}$, to accommodate the additional propagation time introduced by the satellite communications. This value may be known to both the UE and the base station, to allow synchronization of scheduling. Specifically, $K_{offset}$ may represent a delay that is greater than $T_{TA}$; i.e., greater than the roundtrip propagation delay between the UE and the timing reference point. This may be used, e.g., to ensure that UL transmissions are scheduled for transmission in a slot after reception of an UL grant (which may require a time equal to $T_{TA}$). $K_{offset}$ may be expressed as a number of slots for a given SCS.

In some implementations, multiple $K_{offset}$ values may be utilized. For example, the NTN may utilize a cell-specific $K_{offset}$ value for all (or a subset) of UEs within the coverage area, e.g., upon each UE initially connecting to the network, or at other times or conditions. The cell-specific $K_{offset}$ may be configured to be large enough to accommodate the roundtrip time between the farthest UE in the coverage area and the timing reference point. Once a particular UE has connected to the network, the network may provide a UE-specific $K_{offset}$ value for use by that UE, as discussed further, below.

Similarly, the UE and the base station may utilize an additional value, $K_{mac}$, for MAC CE activation timing calculation. Specifically, $K_{mac}$ may represent the roundtrip propagation delay between the timing reference point and the terrestrial base station. $K_{mac}$ may be expressed as a number of slots for a given SCS.

FIG. 5 is a flowchart diagram illustrating an example method for receiving cell-specific $K_{offset}$ and/or $K_{mac}$ values, according to some embodiments. The method of FIG. 5 may be implemented by a UE, such as the UE 106, or by some component thereof, such as by the radio 330 and/or the cellular controller 354.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. As shown, the method of FIG. 5 may operate as follows.

At 502, the UE 106 may determine the satellite altitude scenario. For example, the UE may determine whether a node available for NTN communications is a LEO, MEO, or GEO satellite, a HAPS, or a UAV. This information may be communicated to the UE by the network, e.g., during the connection process.

At 504, the UE may determine a reference SCS used by the network, e.g., for communicating $K_{offset}$ and/or $K_{mac}$.

In some implementations, the reference SCS may be predefined. For example, the reference SCS may be dictated by the satellite altitude scenario. As a specific example, if the UE determined at 502 that the satellite is GEO, then the UE may conclude that the reference SCS is 15 kHz, while a determination at 502 that the satellite is LEO may indicate that the reference SCS is 60 kHz. Other example values are also envisioned. Varying the reference SCS based on the satellite altitude scenario may be useful, in that different satellite altitudes may result in very different propagation delays. Utilizing different reference SCSs for different satellite configurations may therefore allow greater precision in reporting $K_{offset}$ for a particular scenario. In such implementations, the UE may determine the reference SCS by referencing a table or other reference material that indexes possible reference SCSs to satellite altitude scenarios.

As another example of the reference SCS being predefined, the reference SCS may depend on the operational frequency range. As a specific example, the reference SCS for a first frequency range, FR1, may be defined as 15 kHz, while the reference SCS for a second frequency range, FR2, may be defined as 60 kHz. Other example values are also envisioned. In such implementations, the UE may determine the reference SCS by referencing a table or other reference material that indexes possible reference SCSs to operational frequencies.

In some implementations, the reference SCS may not be predefined, but may instead be configured by the network, e.g., dynamically, semi-statically, etc. For example, the network may expressly indicate the reference SCS by broadcasting an indication of the reference SCS in a SIB message. As another example, the reference SCS may implicitly indicate the reference SCS by setting the reference SCS as an initial DL BWP or an initial UL BWP.

At 506, the UE may receive from the network a cell-specific $K_{offset}$ and/or a cell-specific $K_{mac}$ in units of slots in terms of reference SCS.

At 508, the UE may convert the cell-specific $K_{offset}$ and/or $K_{mac}$ to the UE's corresponding slot units; e.g., to the SCS of the UE's active UL bandwidth part (BWP). Specifically, the reference SCS may be expressed in the form SCS=15× $2^{\mu_1}$, in kHz, while the SCS of the UE's active uplink BWP may be expressed as SCS=15×$2^{\mu_2}$, where $\mu_1$, $\mu_2 \in \{0,1,2,3, 4\}$. Then, if the value of $K_{offset}$ is k slots, the number of slots in the UE's active uplink BWP may be expressed as $\lceil k \times 2^{\mu_2-\mu_1} \rceil$. It may be noted that this ceiling function implies that fractional results may be rounded up.

As an example, if the reference SCS is 15 kHz, then the UE may determine that each slot duration in terms of the reference SCS is 1 ms. If the UE's active UL BWP has SCS of 30 kHz, then the UE may determine that each slot duration in terms of the UL SCS is 0.5 ms. Therefore, if the received $K_{offset}$ value is 10, then the UE may determine that this indicates a time value of 10 ms (i.e., 10 slots, each having a duration of 1 ms). The UE may then further determine that this may be expressed as 20 slots in terms of the UE's UL SCS. I.e., this value may be determined as $\lceil 10 \times 2^{1-0} \rceil = 20$. The UE may therefore use the offset value of 20 slots in subsequent UL scheduling.

As another example, if the reference SCS is 30 kHz, and the SCS of the UE's active UL BWP is 15 kHz, and the value of $K_{offset}$ is 3 slots, then this may be expressed in terms of the SCS of the UE's active UL BWP as follows:

$$\lceil 3 \times 2^{0-1} \rceil = \left\lceil \frac{3}{2} \right\rceil = 2 \text{ slots.}$$

In some scenarios, a value range of $K_{mac}$ may depend on the satellite altitude scenario. For example, the value range of $K_{mac}$ may be larger if the satellite is GEO than if the satellite is LEO.

It should be appreciated that, in various embodiments, some of the elements of the method shown may be performed concurrently, in a different order than shown, may be substituted for by other method elements, or may be omitted, and/or additional method elements may be performed as desired. For example, in implementations in which the reference SCS is not based on the satellite altitude scenario, the determination of satellite altitude scenario at 502 may not be relevant to receiving $K_{offset}$ and/or $K_{mac}$, and may therefore be omitted.

Figure 6:
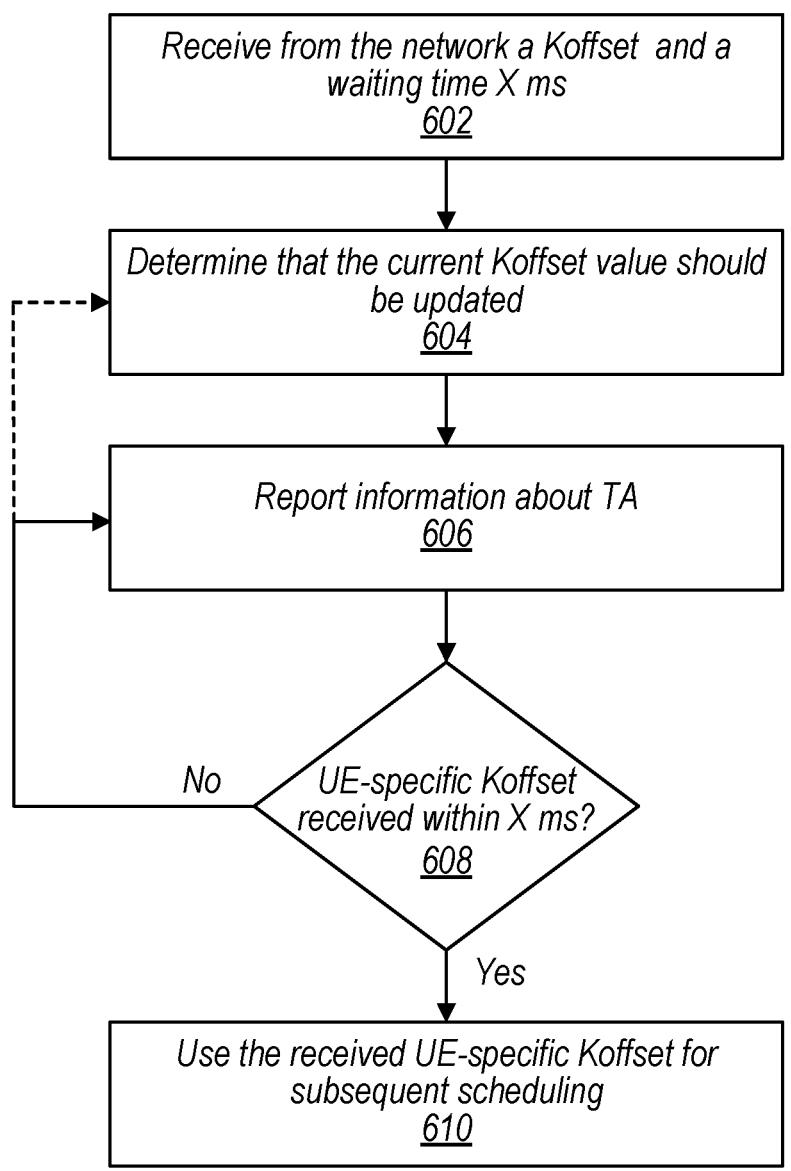
FIG. 6 is a flowchart diagram illustrating a method for failure-handling by intelligent retransmission in connection with reporting of information regarding timing advance (TA), according to some embodiments.
Figure 7:
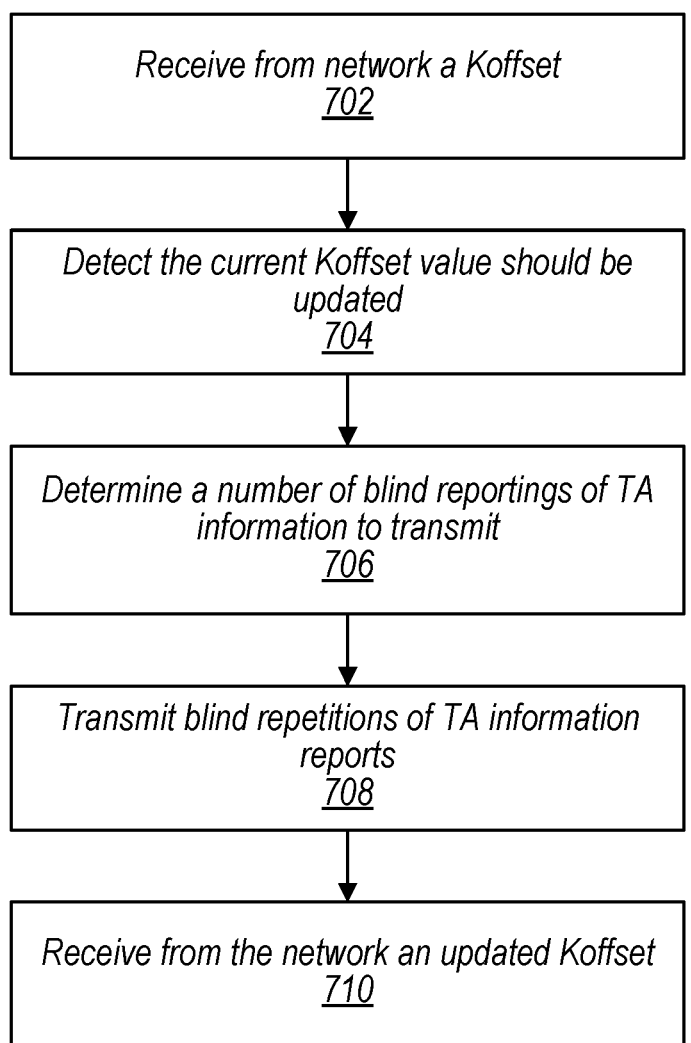
FIG. 7 is a flowchart diagram illustrating a method for failure-handling by blind repetition in connection with reporting of information regarding timing advance (TA), according to some embodiments.

FIGS. 6-7—Failure Handling of TA Information Reporting

Once a particular UE has connected to the network, it may report timing information to the network. For example, the UE may receive information regarding the current location and/or velocity of the UE (e.g., GNSS information via a geolocation module within the UE), and/or information regarding the current location and/or velocity of the applicable satellite (e.g., ephemeris information from the network). In response, the UE may calculate/estimate a current distance between the UE and the satellite. The UE may then estimate a value of $N_{TA,UE-specific}$, based on that distance, and may communicate that estimate, or related information, to the network. In some implementations, the UE may report the total value of $T_{TA}$.

Based on the TA information reported by the UE, the network may provide to the UE a UE-specific $K_{offset}$ for use in subsequent communications. The value of the UE-specific $K_{offset}$ may more closely reflect the TA for that particular UE, based on the distance between the UE and the applicable satellite, which may lead to improved efficiency, relative to utilizing the cell-specific $K_{offset}$ value.

Although the method of FIG. 5 relates to receiving cell-specific $K_{offset}$ and/or $K_{mac}$ values, in some scenarios the same reference SCS determined at 504 may also be applicable to receiving the UE-specific $K_{offset}$ and/or common TA parameters, and/or to reporting TA information to the network.

In some scenarios, the UE's reporting of TA information to the network may fail. For example, the network may fail to receive the reported information, e.g., due to interference, insufficient signal strength, receiver errors, or any of numerous other reasons. Alternatively, the UE may fail to receive the UE-specific $K_{offset}$, e.g., for similar reasons.

FIG. 6 is a flowchart diagram illustrating a method for handling such failures by intelligent retransmission, according to some embodiments. The method of FIG. 6 may be implemented by a UE, such as the UE 106, or by some component thereof, such as by the radio 330 and/or the cellular controller 354. Note that while at least some elements of the method of FIG. 6 are described in a manner relating to the use of communication techniques and/or features associated with 3GPP and/or NR specification documents, such description is not intended to be limiting to the disclosure, and aspects of the method of FIG. 6 may be used in any suitable wireless communication system, as desired. As shown, the method of FIG. 6 may operate as follows.

At 602, the UE 106 may receive from the network a $K_{offset}$ value. The $K_{offset}$ value may be either a cell-specific $K_{offset}$ or a UE-specific $K_{offset}$. The UE 106 may utilize the received $K_{offset}$ value for communication scheduling.

In some scenarios, the UE 106 may also receive a waiting time (X), e.g., in ms. In other scenarios, X may be preconfigured, and may therefore not be received from the network at 602. In some scenarios, X may depend on the satellite altitude scenario. For example, X may be larger when the satellite is GEO than when the satellite is LEO, to accommodate the longer propagation delay. In some scenarios, X may depend on a roundtrip propagation time, such as the time between the UE and the terrestrial base station, via the satellite. For example, the UE may estimate the roundtrip time between the UE and the terrestrial base station, via the satellite, and set X to consist of the estimated roundtrip time, plus an additional offset time.

The value of X may be reported in various formats, such as an absolute time value or a number of slots, e.g., in terms of a reference SCS. Such a reference SCS may be the reference SCS determined at 504, or may be distinct reference SCS. If distinct, the reference SCS may be determined in a manner similar to that described at 504. For example, the reference SCS may be pre-defined or configured by the network, and may depend on the satellite altitude scenario and/or other variables.

At 604, the UE 106 may determine that the current $K_{offset}$ value (which may be either a UE-specific value or a cell-specific value) should be updated. For example, the UE 106 may detect a trigger event indicating that the $K_{offset}$ value should be updated. In some scenarios, this trigger event may be based on a calculation of the TA. For example, the UE may calculate a current value of TA ($TA_{new}$), and may determine that $TA_{new}$ differs from a previous value of TA ($TA_{old}$) by more than (or by at least) a threshold value c. I.e., the UE may determine that $TA_{new}-TA_{old}>c$. The value of $TA_{old}$ may be the value of TA that was most recently acknowledged by the network, e.g., after having been reported by the UE 106. The values $TA_{new}$ and $TA_{old}$ may represent total TA values (e.g., $T_{TA}$ as defined in Equation 2) or may represent a UE-specific portion of the TA (e.g., $N_{TA,UE-specific}$).

At 606, the UE 106 may report (e.g., transmit) information regarding $TA_{new}$ to the network. For example, the UE 106 may report a full TA value, a UE-specific TA value, a differential TA value, a differential $K_{offset}$, etc. In some scenarios, the information may be reported as a number of slots, in terms of the reference SCS. In some scenarios the information may be transmitted, e.g., in an RRC reconfiguration field or in a MAC CE.

As outlined above, the UE may expect to receive from the network a UE-specific $K_{offset}$ value, responsive to the information regarding $TA_{new}$ reported at 606. At 608, the UE 106 may determine whether it has received such a UE-specific $K_{offset}$ value within the time X of reporting the information at 606. If it has received the UE-specific $K_{offset}$ value within the time X, then the UE 106 may, at 610, utilize the received UE-specific $K_{offset}$ value for subsequent scheduling. However, if, at 608, the UE has not received the UE-specific $K_{offset}$ value within X ms, then the UE 106 may return to 606, and again report the information regarding $TA_{new}$ to the network.

In some implementations, the UE 106 may instead return to 604, to determine whether the trigger condition for reporting the information is still met prior to reporting the information. For example, the UE 106 may determine whether the inequality $TA_{new}-TA_{old}>c$ is still met. This may include calculating an updated $TA_{new}$. In such scenarios, again reporting the information regarding $TA_{new}$ at 606 may include reporting information regarding the updated $TA_{new}$.

In some scenarios, it may be desirable to retransmit the information regarding $TA_{new}$ more quickly than would be possible if waiting for the TA reporting to make a round trip. To avoid this delay, the UE may report information regarding $TA_{new}$ with blind repetition. The reporting re-transmissions may be blindly repeated, i.e., without waiting for the time X before sending a new reporting.

FIG. 7 is a flowchart diagram illustrating such a method for failure-handling by blind repetition, according to some embodiments. The method of FIG. 7 may be implemented by a UE, such as the UE 106, or by some component thereof, such as by the radio 330 and/or the cellular controller 354. Note that while at least some elements of the method of FIG. 7 are described in a manner relating to the use of communication techniques and/or features associated with 3GPP and/or NR specification documents, such description is not intended to be limiting to the disclosure, and aspects of the method of FIG. 7 may be used in any suitable wireless communication system, as desired. As shown, the method of FIG. 7 may operate as follows.

At 702, the UE 106 may receive from the network a $K_{offset}$ value. The $K_{offset}$ value may be either a cell-specific $K_{offset}$ or a UE-specific $K_{offset}$. The UE 106 may utilize the received $K_{offset}$ value for communication scheduling.

At 704, the UE 106 may determine that the current $K_{offset}$ value should be updated. This determination may be based on a calculation of the TA, e.g., in the same or similar manner as 604. E.g., the UE 106 may determine that $TA_{new}-TA_{old}>c$. The value of $TA_{old}$ may be the most recently reported value of TA that was acknowledged by the network.

At 706, the UE 106 may determine a number of blind reportings to transmit to the network. In some scenarios, the number of blind repetitions may depend on the gap between $TA_{new}$ and $TA_{old}$. For example, the UE 106 may determine to transmit a larger number of repetitions if the gap is larger, based on the reasoning that, if the change in the TA value is large, then ensuring delivery of the TA information may be more critical.

Similarly, in some scenarios, the number of blind repetitions may depend on the gap between $K_{offset}$ and the full TA (e.g., $T_{TA}$ as defined in Equation 2). For example, the UE 106 may determine to transfer a larger number of repetitions if the gap is smaller, based on the reasoning that UL scheduling may fail if the full TA exceeds $K_{offset}$, such that ensuring delivery of the TA information may be more critical if the full TA approaches $K_{offset}$.

In some scenarios, the number of blind repetitions may depend a number of times the UE 106 has previously reported information regarding $TA_{new}$ without receiving a $K_{offset}$ in response. For example, the UE 106 may initially send only a single transmission of the information regarding $TA_{new}$. However, if the UE 106 does not receive a $K_{offset}$ in response, then, upon a subsequent implementation of the method of FIG. 7, the UE 106 may transmit an increased number of repetitions of the information regarding $TA_{new}$. In some scenarios, more than one failure may be needed before the UE 106 increases the number of repetitions.

In some scenarios, the number of blind repetitions may be based on network configuration. For example, the network may expressly indicate a number of blind repetitions.

At 708, the UE 106 may transmit information regarding $TA_{new}$ to the network, according to the number of repetitions determined at 706. For example, the UE 106 may report a full TA value, a UE-specific TA value, a differential TA value, a differential $K_{offset}$, etc. In some scenarios, the information may be reported as a number of slots, in terms of the reference SCS. In some scenarios the information may be transmitted, e.g., in an RRC reconfiguration field or in a MAC CE. The repetitions may be transmitted, e.g., at fixed intervals, without awaiting receipt of a responsive $K_{offset}$ from the network.

At 710, the UE 106 may receive from the network a UE-specific $K_{offset}$ value, responsive to the information regarding TAnew reported at 708. This $K_{offset}$ value may be updated relative to the $K_{offset}$ value received at 702, based on the information regarding $TA_{new}$ reported at 708. The UE 106 may utilize the received updated UE-specific $K_{offset}$ value for subsequent scheduling.

Maintenance of Open-Loop and Closed-Loop TA Control

As previously noted, when the UE calculates $T_{TA}$ according to Equation 2, it utilizes both closed-loop components (e.g., $N_{TA}$) and open-loop components (e.g., $N_{TA,UE-specific}$ and $N_{TA,common}$). Utilizing both open-and closed-loop components simultaneously introduces a risk of conflict, as different components may double-compensate for a particular delay.

For example, the network will control the TA value of the UE via the TA command. As previously noted, the TA command may carry a value of $N_{TA}$, based on the timing offset of transmissions received from the UE by the network; e.g., by the terrestrial base station. As also noted above, the UE may calculate the value $N_{TA,UE-specific}$ based on location information of the UE and the applicable satellite. However, the UE may receive updates regarding its location and/or the satellite's location only periodically. For example, the UE may receive GNSS coordinates of the UE, e.g., from a geolocation module included in the UE, and may respond by determining a current value of $N_{TA,UE-specific}$. However, as the UE continues to move, this value of $N_{TA,UE-specific}$ may become outdated until the UE receives updated GNSS coordinates. In the meantime, the outdated $N_{TA,UE-specific}$ value may cause the total TA value to become inaccurate.

The network may observe this increasing TA margin, and may respond by adjusting the closed-loop value of $N_{TA}$ to compensate. However, at a later time, the UE may receive updated GNSS coordinates, and may respond by determining an updated value of $N_{TA,UE-specific}$. This may remove the error introduced by the outdated $N_{TA,UE-specific}$ value, even though that error had already been corrected via $N_{TA}$. Thus, the value of $N_{TA}$ would be incorrect, as it continues to compensate for an error that has been removed. Further complicating this issue is the fact that $N_{TA}$ may have been further adjusted to compensate for additional error that did not result from the outdated value of $N_{TA,UE-specific}$. It may therefore not be appropriate to simply reset $N_{TA}$ each time $N_{TA,UE-specific}$ is updated.

Adjustments to $N_{TA,common}$ may introduce similar concerns.

To address these concerns, $N_{TA}$ may be intelligently adjusted to account for adjustments in open-loop values $N_{TA,UE-specific}$ and/or $N_{TA,common}$, e.g., as follows.

Upon receiving updated location information, such as an updated GNSS position information of the UE and/or updated satellite ephemeris parameters, the UE may determine an updated value of $N_{TA,UE-specific}$, which may be referred to as $N_{TA,UE-specific,new}$. The most recent previous value of $N_{TA,UE-specific}$ (e.g., from prior to receiving the updated location information) may be referred to as $N_{TA,UE-specific,old}$. A value $\Delta N_{TA,UE-specific}$ may be defined as follows:

$$N_{TA,UE-specific}=N_{TA,UE-specific,new}-N_{TA,UE-specific,old} \qquad \text{Equation 5}$$

In this context, a value $\Delta N_{TA}$ may be defined as the cumulative TA adjustment received via TA commands in MAC CE between the two most recent updates to the location information. In other words, $\Delta N_{TA}$ may represent the cumulative adjustment to $N_{TA}$ received between the calculation of $N_{TA,UE-specific,old}$ and the calculation of $N_{TA,UE-specific,new}$.

In some scenarios, in response to calculating (or applying, etc.) the value $N_{TA,UE-specific,new}$, the value of $N_{TA}$ may be reduced by $\Delta N_{TA}$ if one or more of the following conditions are met. This may effectively remove the TA adjustment represented by $\Delta N_{TA}$ under certain conditions.

$$|\Delta N_{TA,UE-specific}| \geq a_1 \qquad \text{Condition 1}$$

Here, $a_1$ is a predetermined threshold value. If condition 1 is satisfied, then the TA value has a large variation due to an updated GNSS position fix or updated satellite ephemeris parameters. This implies that $N_{TA}$ has likely been updated significantly to adjust for error in $N_{TA,UE-specific}$, such that this adjustment should be removed upon updating $N_{TA,UE-specific}$.

$$|\Delta N_{TA}| \geq a_2 \qquad \text{Condition 2}$$

Here, $a_2$ is a predetermined threshold value. If condition 2 is satisfied, then the accumulated TA command adjustments between the last two updates to location information are not negligible, and should be removed upon updating $N_{TA,UE-specific}$.

$$|\Delta N_{TA}-\Delta N_{TA,UE-specific}| \leq b \qquad \text{Condition 3}$$

Here, b is a predetermined threshold value. If condition 3 is satisfied, then the majority of accumulated TA command in closed loop TA control is to compensate for variation in $N_{TA,UE-specific}$. Thus, this adjustment should be removed upon updating $N_{TA,UE-specific}$.

In some scenarios, the UE may monitor for only a particular one of conditions 1-3. In other scenarios, the UE may monitor for any/all of the conditions, or for a defined combination of the two of the conditions.

The UE may monitor for similar conditions in connection with receiving from the network updated common TA parameters, such as $N_{TA,common}$. For example, a new common TA parameter received from the network may be referred to as $N_{TA,common,new}$. The most recent previously received common TA parameter may be referred to as $N_{TA,common,old}$. A value $\Delta N_{TA,common}$ may be defined as follows:

$$\Delta N_{TA,common}=N_{TA,common,new}-N_{TA,common,old} \qquad \text{Equation 6}$$

In this context, $\Delta N_{TA}$ may be defined as the cumulative TA adjustment received via TA commands in MAC CE between the two most recent updates to the common TA. In other words, $\Delta N_{TA}$ may represent the cumulative adjustment to $N_{TA}$ received between receiving $N_{TA,common,old}$ and $N_{TA,common,new}$.

In some scenarios, in response to receiving (or applying, etc.) the value $N_{TA,common,new}$, the value of $N_{TA}$ may be reduced by $\Delta N_{TA}$ if one or more of the following conditions are met. This may effectively remove the TA adjustment represented by $\Delta N_{TA}$ under certain conditions.

$$|\Delta N_{TA,common}| \geq c_1 \qquad \text{Condition 4}$$

Here, $c_1$ is a predetermined threshold value. If condition 4 is satisfied, then the TA value has a large variation due to the common TA parameters update. This large variation on the open-loop TA control may be already compensated by the closed-loop TA control. The closed-loop $N_{TA}$ should therefore be adjusted upon updating $N_{TA,common}$.

$$|\Delta N_{TA}| \geq c_2 \qquad \text{Condition 5}$$

Here, $c_1$ is a predetermined threshold value. If condition 5 is satisfied, then the accumulated TA command adjustments between the last two common TA updates are not negligible, and should be removed upon updating $N_{TA,common}$.

$$|\Delta N_{TA} - \Delta N_{TA,common}| \leq d \qquad \text{Condition 6}$$

Here, d is a predetermined threshold value. If condition 5 is satisfied, then the majority of accumulated TA command in closed loop TA control is to compensate for variation in $N_{TA,common}$. Thus, this adjustment should be removed upon updating $N_{TA,common}$.

In some scenarios, one or more of the threshold values $a_1$, $a_2$, b, $c_1$, $c_2$, and d may be configured by network, may depend on SCS, and/or may depend on satellite altitude scenario (e.g., LEO or GEO).

Various embodiments may be described in detail, as specific examples. For example, a method of updating a timing advance value for timing synchronization in a cellular communication non-terrestrial network may be described, wherein the timing advance value represents a dynamic sum of a plurality of timing offset values. The method may include, by a user equipment (UE) device: dynamically updating a closed-loop timing offset value of the plurality of timing offset values upon receiving, from the non-terrestrial network, adjustment values representing timing offsets based on reception times of respective communications received by the non-terrestrial network from the UE device, wherein dynamically updating the closed-loop timing offset value includes adding the received adjustment values to the present closed-loop timing offset value; updating, at a first time, a UE-specific timing offset value of the plurality of timing offset values to reflect a first roundtrip propagation time between the UE device and a satellite of the non-terrestrial network, wherein the first roundtrip propagation time is calculated by the UE based on first location information regarding at least one of the UE device or the satellite, wherein the updating is performed in response to the UE device receiving the first location information; updating, at a second time, subsequent to the first time, the UE-specific timing offset value to reflect a second roundtrip propagation time between the UE device and the satellite, wherein the second roundtrip propagation time is calculated by the UE based on second location information regarding at least one of the UE device or the satellite, wherein the updating is performed in response to the UE device receiving the second location information; and upon updating the UE-specific timing offset to reflect the second roundtrip propagation time, reducing the closed-loop timing offset value by an amount equal to the adjustment values received between the first time and the second time, wherein reducing the closed-loop portion is in response to determining at least one of: a difference ($\Delta N_{TA, UE\text{-}specific}$) between the UE-specific timing offset value at the first time and the UE-specific timing offset value at the second time meets a first predefined threshold; a difference ($\Delta N_{TA}$) between the closed-loop timing offset value at the first time and the closed-loop timing offset value at the second time meets a second predefined threshold; or a difference between $\Delta N_{TA}$ and $\Delta N_{TA, UE\text{-}specific}$ is below a third predefined threshold.

In some examples of the preceding method, the values of at least one of the first predefined threshold, the second predefined threshold, or the third predefined threshold depend on a satellite altitude scenario of the non-terrestrial network.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

determining a reference sub-carrier spacing (SCS) used by a non-terrestrial network;

determining that a current cell-specific scheduling offset value (Koffset) should be updated;

determining, in response to the determining that the current cell-specific $K_{offset}$ should be updated, a number of blind repetitions of updated timing advance (TA) information to transmit to the non-terrestrial network;

transmitting the determined number of blind repetitions of the updated TA information;

receiving, responsive to the updated TA information, an updated $K_{offset}$ that represents a time at least as large as a roundtrip propagation delay between a user equipment (UE) and a timing reference point of the non-terrestrial network, wherein the updated $K_{offset}$ is expressed in units of slots in terms of the reference SCS;

calculating a number of slots representing the updated $K_{offset}$ in terms of a local SCS used for the UE's active uplink bandwidth part (BWP); and performing uplink scheduling, wherein the uplink timing is adjusted by the calculated number of slots in terms of the local SCS.

2. The method of claim 1, wherein the first predetermined value of the reference SCS is 15 kHz.

3. The method of claim 1, further comprising receiving information regarding the satellite altitude scenario from the non-terrestrial network.

4. The method of claim 1, further comprising receiving from the non-terrestrial network a System Information Block (SIB) including an indication of the reference SCS.

5. The method of claim 1, wherein the updated Koffset, expressed in units of slots in terms of the reference SCS is k slots, wherein the reference SCS is 15 kHz, wherein the local SCS is 15×2ˆ μ in kHz, where μ ∈{0, 1,2,3,4}, and wherein the updated $K_{offset}$ expressed in units of slots in terms of the local SCS, is ceil(k×2ˆ μ).

6. The method of claim 1, further comprising receiving a second scheduling offset value ($K_{mac}$) that represents a roundtrip propagation delay between the timing reference point of the non-terrestrial network and a terrestrial base station, wherein $K_{mac}$ is expressed in units of slots in terms of the reference SCS.

7. The method of claim 1, wherein the number of blind repetitions is determined based at least in part on a gap between a value of the updated TA information and a value of previous TA information.

8. The method of claim 1, wherein the number of blind repetitions is determined based at least in part on a gap between the current $K_{offset}$ and a current TA value.

9. The method of claim 1, wherein the number of blind repetitions is determined based at least in part on a number of previous times in which updated TA information has been transmitted one or more times without receiving an updated $K_{offset}$.

10. The method of claim 1, wherein the number of blind repetitions is determined based at least in part on a configuration of the non-terrestrial network.

11. An apparatus comprised in a user equipment (UE), comprising:

one or more processors configured to:

determine a reference sub-carrier spacing (SCS) used by a non-terrestrial network;

determine that a current cell-specific scheduling offset value (Koffset) should be updated;

determine a number of blind repetitions of updated timing advance (TA) information to transmit to the non-terrestrial network;

transmit the determined number of blind repetitions of the updated TA information;

receive an updated $K_{offset}$ that represents a time at least as large as a roundtrip propagation delay between the UE and a timing reference point of the non-terrestrial network, wherein the updated $K_{offset}$ is expressed in units of slots in terms of the reference SCS;

calculate a number of slots representing the updated $K_{offset}$ in terms of a local SCS used for the UE's active uplink bandwidth part (BWP); and perform uplink scheduling, wherein the uplink timing is adjusted by the calculated number of slots in terms of the local SCS.

12. The apparatus of claim 11, wherein the first predetermined value of the reference SCS is 15 kHz.

13. The apparatus of claim 11, wherein the one or more processors are further configured to receive information regarding the satellite altitude scenario from the non-terrestrial network.

14. The apparatus of claim 11, wherein the one or more processors are further configured to receive from the non-terrestrial network a System Information Block (SIB) including an indication of the reference SCS.

15. The apparatus of claim 11, wherein the one or more processors are further configured to receive a second scheduling offset value ($K_{mac}$) that represents a roundtrip propagation delay between the timing reference point of the non-terrestrial network and a terrestrial base station, wherein $K_{mac}$ is expressed in units of slots in terms of the reference SCS.

16. The apparatus of claim 11, wherein the number of blind repetitions is determined based at least in part on a gap between a value of the updated TA information and a value of previous TA information.

17. The apparatus of claim 11, wherein the number of blind repetitions is determined based at least in part on a gap between the current $K_{offset}$ and a current TA value.

18. A non-transitory computer-readable memory medium storing software instructions that, when executed by a processor of a user equipment (UE) device, cause the UE device to:

determine a reference sub-carrier spacing (SCS) used by a non-terrestrial network;

determine that a current cell-specific scheduling offset value ($K_{offset}$) should be updated;

determine a number of blind repetitions of updated timing advance (TA) information to transmit to the non-terrestrial network;

transmit the determined number of blind repetitions of the updated TA information;

receive an updated $K_{offset}$ that represents a time at least as large as a roundtrip propagation delay between the UE and a timing reference point of the non-terrestrial network, wherein the updated $K_{offset}$ is expressed in units of slots in terms of the reference SCS;

calculate a number of slots representing the updated $K_{offset}$ in terms of a local SCS used for the UE's active uplink bandwidth part (BWP); and perform uplink scheduling, wherein the uplink timing is adjusted by the calculated number of slots in terms of the local SCS.

19. The non-transitory computer-readable memory medium of claim 18, wherein the software instructions further cause the UE device to receive from the non-terrestrial network a System Information Block (SIB) including an indication of the reference SCS.

20. The non-transitory computer-readable memory medium of claim 18, wherein the software instructions further cause the UE device to receive a second scheduling offset value ($K_{mac}$) that represents a roundtrip propagation delay between the timing reference point of the non-terrestrial network and a terrestrial base station, wherein $K_{mac}$ is expressed in units of slots in terms of the reference SCS.

* * * * *